United States Patent
Rollero

(10) Patent No.: US 10,345,429 B2
(45) Date of Patent: Jul. 9, 2019

(54) METHOD FOR LOCATING A TRANSMITTER OF UNKNOWN POSITION WITH SYNCHRONIZED RECEIVERS OF KNOWN POSITIONS

(71) Applicant: AMESYS, Aix-en-Provence (FR)

(72) Inventor: Rémi Rollero, Pertuis (FR)

(73) Assignee: AMESYS, Aix-en-Provence (FR)

( * ) Notice: Subject to any disclaimer, the term of this patent is extended or adjusted under 35 U.S.C. 154(b) by 47 days.

(21) Appl. No.: 15/537,813

(22) PCT Filed: Dec. 16, 2015

(86) PCT No.: PCT/FR2015/053534
§ 371 (c)(1),
(2) Date: Jun. 19, 2017

(87) PCT Pub. No.: WO2016/097595
PCT Pub. Date: Jun. 23, 2016

(65) Prior Publication Data
US 2017/0371025 A1 Dec. 28, 2017

(30) Foreign Application Priority Data
Dec. 19, 2014 (FR) ...................... 14 62941

(51) Int. Cl.
*H04W 24/00* (2009.01)
*G01S 5/06* (2006.01)
(Continued)

(52) U.S. Cl.
CPC ............... *G01S 5/06* (2013.01); *G01S 5/021* (2013.01); *G01S 5/0221* (2013.01); *G01S 5/0226* (2013.01); *G01S 5/14* (2013.01)

(58) Field of Classification Search
CPC .......... G01S 5/021; G01S 5/0226; G01S 5/14; G01S 5/0221; G01S 5/06
(Continued)

(56) References Cited

U.S. PATENT DOCUMENTS 5,534,876 A * 7/1996 Erickson ............... G01S 5/0221
340/8.1
2002/0059535 A1 5/2002 Bekritsky
(Continued)

FOREIGN PATENT DOCUMENTS

| EP | 2 642 313 A1 | 9/2013 |
|----|----|----|
| WO | WO 2005/111654 A1 | 11/2005 |
| WO | WO 2011/011360 A1 | 1/2011 |

OTHER PUBLICATIONS

International Search Report related to Application No. PCT/FR2015/053534 dated Mar. 8, 2016.
(Continued)

*Primary Examiner* — Huy C Ho
(74) *Attorney, Agent, or Firm* — Miller, Matthias & Hull LLP

(57) ABSTRACT

The invention relates to a method for locating a signal transmitter whose position is unknown, by the use of signal receivers which are synchronized with each other to a common time reference and whose positions are known, comprising: a step of multilateration by time difference of arrival, which is done with the signals sent by the transmitter with unknown position and respectively received by the receivers, characterized in that: said step of multilateration by time difference of arrival is preceded by a step of evaluation of the time offsets between the values from the common time reference respectively known by the receivers, and said step of multilateration by time difference of arrival is done by correcting said temporal offsets so as to
(Continued)

reset the receivers to said same common time reference value.

13 Claims, 2 Drawing Sheets

(51) Int. Cl.
    *G01S 5/02*     (2010.01)
    *G01S 5/14*     (2006.01)

(58) Field of Classification Search
    USPC ..................................................... 455/456.1
    See application file for complete search history.

(56) References Cited

U.S. PATENT DOCUMENTS

| | | |
|---|---|---|
| 2008/0231494 A1 | 9/2008 | Galati |
| 2009/0322615 A1* | 12/2009 | Schwarzer .............. G01S 5/021 |
| | | 342/387 |
| 2011/0156878 A1 | 6/2011 | Wu |
| 2014/0092759 A1 | 4/2014 | Pisharody |

OTHER PUBLICATIONS

French Search Report related to Application No. FR 14 629.41 dated Dec. 19, 2014.

* cited by examiner

METHOD FOR LOCATING A TRANSMITTER OF UNKNOWN POSITION WITH SYNCHRONIZED RECEIVERS OF KNOWN POSITIONS

CROSS-REFERENCE TO RELATED APPLICATION

This Application is a 35 USC § 371 US National Stage filing of International Application No. PCT/FR2015/053534 filed on Dec. 16, 2015, and claims priority under the Paris Convention to French Patent Application No. 14 62941 filed on Dec. 19, 2014.

FIELD OF THE INVENTION DISCLOSURE

The invention relates to a method for locating a signal transmitter whose position is unknown using signal receivers which are synchronized with each other to a common time reference and whose positions are known, and locating process based on this locating method, and also a system for locating a signal transmitter whose position is unknown using signal receivers which are synchronized with each other to a common time reference and whose positions are known.

BACKGROUND OF THE DISCLOSURE

According to a first prior art, for example described in the patent application WO 2005/111654, a method is known for locating a passive radar target by several radars synchronized to a common time reference given by GPS, based on a multilateration by time difference of arrival.

According to a second prior art, for example described in the patent application WO 2011/011360, a method is known for locating an airplane on approach to an airport by several transponders which respond to the signal sent by the aircraft on approach, based on a multilateration by time difference of arrival.

According to a third prior art, for example described in the patent application EP 2,642,313, a locating method is known based on multilateration by time difference of arrival, with precision improved by using an algorithm based on an autocorrelation of the signal received by each receiver preceding the phase of measurement of the signal trajectory time differences received by different receivers and does so for reducing the quantity of information passing between the receivers and the calculation unit.

SUMMARY OF THE DISCLOSURE

In all the aforementioned prior art, the precision of the locating methods considered is limited, in particular because of the intrinsic imprecision of the value of the common time reference sent to each receiver.

The purpose of the present invention is to provide a locating method at least partially remedying the aforementioned disadvantages.

More specifically, the invention aims to provide a locating method with better precision, based on a multilateration by time difference of arrival preceded by a temporal resetting compensating for the differences between the values, received by the synchronized receivers, of the common time reference thereof.

In fact, the values, received by the synchronized receivers, of the common time reference thereof, are not rigorously identical and comprise some imprecision. The temporal resetting, on one single common time reference, for the synchronized receivers, serves to eliminate this imprecision.

The common time reference values, received by the various synchronized receivers, are preferably sent by a geolocalization system in the form of an absolute reference time. In the case of GPS (Global Positioning System), this UTC time is sent with an imprecision of order 100 ns at 5 sigma, which corresponds to a potential error of about 30 m in the location of the unknown transmitter. The locating method proposed by the invention is going to greatly reduce, or even practically eliminate, this potential error in the location of the unknown transmitter.

For this purpose, the present invention proposes a method for locating a signal transmitter whose position is unknown, by the use of signal receivers which are synchronized with each other to a common time reference and whose positions are known, comprising: a step of multilateration by time difference of arrival, which is done with the signals sent by the transmitter with unknown position and respectively received by the receivers, characterized in that: said step of multilateration by time difference of arrival is preceded by a step of evaluation of the time offsets between the values from the common time reference respectively known by the receivers, and said step of multilateration by time difference of arrival is done by correcting said temporal offsets so as to reset the receivers to a single time reference value common to the receivers or each pair of receivers.

The time reference value can be common to all receivers. The time reference value can be common to each pair of receivers when the signals are reset with respect to each other. The reference values between two pairs of receivers can be very slightly different between them, but much closer than they had been in the beginning.

Multilateration by time difference of arrival is also called TDOA multilateration (for "Time Difference of Arrival Multilateration").

The common time reference is preferably the origin of the shared time base or else a phase at the origin of the shared time base or even a common time reference with which to synchronize the receivers with each other.

The purpose of the calibration done is to reset the time axes between them, meaning their value at the origin, without modifying their scale, meaning the sampling rate of the receivers which is for example set to the GPS clock frequency.

The receivers are synchronized with each other; they are set to the same common time reference, up to the errors in the value of this common time reference, that the invention additionally has the goal of correcting. The receivers have a common rate for acquiring received signals.

Preferably, said step of evaluation does: a calculation of the time-of-flight differences, between receivers, of the signals transmitted by another transmitter of known position at a different frequency from that of the transmitter of unknown position and respectively received by the receivers, based on known positions of the receivers and of that other transmitter of known position, a measurement of said time-of-flight differences, by cross-correlation between the signals received by the receivers, and a comparison between said calculated time-of-flight differences and said measured time-of-flight differences, giving, for each receiver, said temporal reset. As an alternative, said step of evaluation is does: a calculation of the time-of-flight differences, between receivers, of the signals transmitted by another transmitter of known position at a frequency identical to that of the transmitter of unknown position, but during a transmission time window which is distinct from that of the transmitter of unknown position and respectively received by the receivers, based on known positions of the receivers and of that other transmitter of known position, a measurement of said time-of-flight differences, by cross-correlation between the signals received by the receivers, and a comparison between said calculated time-of-flight differences and said measured time-of-flight differences, giving, for each receiver, said temporal reset.

The use of a transmitter of known position is a simple and effective means for determining the temporal offsets between the reference time values as known to the synchronized receivers. It is first the knowledge of these temporal offsets and next their compensation which allows temporal resetting of the synchronized receivers, and advantageously all receivers synchronized between them, to one single common time reference value, thus improving the precision of the location of the unknown transmitter.

For this purpose, the present invention also proposes a system for locating a signal transmitter whose position is known, by the use of signal receivers which are synchronized with each other to a common time reference and whose positions are known, comprising: signal receivers which are synchronized between them to a common time reference and whose positions are known, a processing unit suited for performing a step of multilateration by time difference of arrival, which is done with the signals sent by the transmitter with unknown position and respectively received by the receivers, characterized in that said processing unit is also suited such that: said step of multilateration by time difference of arrival is preceded by a step of evaluation of the time offsets between the values from the common time reference respectively known by the receivers, and said step of multilateration by time difference of arrival is done by correcting said temporal offsets so as to reset the receivers to a single time reference value common to the receivers or each pair of receivers.

According to preferred embodiments, the invention comprises one or more of the following features which can be used separately or in partial combination between them or in total combination between them, combined with one or another of the previously presented objects of the invention.

Preferably, the signals sent by the transmitter of unknown position and respectively received by the receivers are recorded by the receivers simultaneously with the signals sent by this other transmitter of known position and respectively received by the receivers, where said receivers have a sufficiently broad receiving band for simultaneously receiving signals at different frequencies corresponding respectively to the transmission frequency of said transmitter of unknown position and the transmission frequency of said other transmitter of known position.

Thus, a single broadband signal received by each receiver contains both the useful signal for performing the multilateration step and the reference signal for temporal resetting of the receivers. The broadband feature of the receiver also allows locating several, even many, transmitters of unknown position, all transmitting at frequencies different from each other. Several known position transmitters could also be used for improving the precision of the correction.

Preferably, this other transmitter of known position is located in the middle of the receivers, preferably near the barycenter of the receivers.

In that way the evaluation of the temporal offsets is made both simpler and more precise.

The known position of the receivers is fixed, at least throughout the length of displacement of the transmitter of unknown position. The receivers are advantageously located on the perimeter of the space within which the transmitter of unknown position could be moving, preferably regularly spaced from each other.

Preferably, said step of multilateration does a cross-correlation between the signals received by the receivers at the transmission frequency of said transmitter of unknown position, where said signals were previously temporally reset to said same common time reference value.

The cross-correlation is done with a sliding time window and the time position maximizing this cross-correlation is representative of the time-of-flight difference of the signal first between the transmitter of unknown position and the receiver corresponding to one of the cross-correlated signals and second between the transmitter of unknown position and the receiver corresponding to the other cross-correlated signal. The time-of-flight differences are representative of the corresponding distance differences which next allow obtaining the actual position of the transmitter of unknown position by simple and conventional geometric construction.

Preferably, receivers continuously and without interruption record the period extending between, first, receiving signals sent by the transmitter of known position that are used for performing said step of evaluation of said temporal offsets and, second, receiving the signals sent by the transmitter of unknown position that are used for performing said multilateration step.

In that way, the common time reference will definitely be the same, for both the signals sent by the transmitter of known position and the signals sent by the transmitter of unknown position, at the receivers receiving these signals. Additionally, as the difference between the moment of performing the temporal resetting and the moment of performing the multilateration is shorter, the measurement error, due this time to the uncertainty in the acquisition frequency, will be smaller. As an example, the uncertainty in the GPS acquisition frequency is of order $10^{-12}$ per day.

Preferably, the signals sent by the transmitter of unknown position and respectively received by the receivers are continuously recorded by the receivers, preferably over a period of at least one or more hours.

Thus, the evaluation and multilateration steps can then be done at several points, even at many points, which allows refining and averaging the results obtained. Additionally, as the recording time gets longer, the cross-correlation length can be longer and more measurements can be done reliably with weak broadband emissions.

Additionally, upon recognition of an event to be analyzed, the recordings can be stopped and then they can be returned to the calculation unit which will then be able to perform the measurement over the last minutes or the last hours of interest.

Additionally, it can also be provided that the transmitter of known position be a dedicated transmitter whose transmission could be triggered remotely either by wire or radio connection, under the control of the calculation unit when it wants to retrieve data for being able to locate a transmitter of unknown position. This is then attractive for making this transmitter of known position more discrete.

Preferably, the number of receivers is at least three, preferably at least four.

Thus, multilateration by time difference of arrival is able to get a single position for the transmitter of unknown position, or even improve further the position obtained by resection of information.

Preferably, said common time reference is the absolute time given by a geolocalization system, preferably UTC time (UTC for "Universal Time Coordinated" or "Coordinated Universal Time") given by GPS.

This absolute time is given with a precision of order 100 ns to five sigmas, which corresponds to a potential distance error of 30 m maximum for the large majority of cases. Once the various values of the common time reference, known from the synchronized receivers, [are] reset among them, the precision can become of order 1 m, or even better.

Preferably, said signals are sent in a frequency range which can be intercepted in their entirety by a receiver or by a receiver/recorder.

Preferably said signals are sent in a radio frequency range, preferably in the HF frequency range, extending from 3 MHz to 30 MHz, and/or in the VHF frequency range, extending from 30 MHz to 300 MHz, and/or in the UHF frequency range extending from 300 MHz to 3000 MHz.

Since radio waves have a large range and are less sensitive to obstacles than other waves, such as light waves, a vast territory even scattered with obstacles can still be covered.

Preferably, the locating method according to the invention is used in a locating process, in a prison, where prisoners are each provided with a signal transmitter of unknown position operating at a different frequency from that of other prisoners. There, a very precise location, for example of order 1 m or even less, is going to be particularly attractive.

Preferably, the locating method according to the invention is used in a locating process, in a nuclear power plant, where staff are each provided with a signal transmitter of unknown position operating at a different frequency from that of other staff. There, a very precise location, for example of order 1 m or even less, is going to be particularly attractive.

Preferably, the locating method according to the invention is used in a locating process, in a disaster zone, like for example after an avalanche or an earthquake, where people are each provided with a signal transmitter of unknown position operating at a different frequency from that of other people. There, a very precise location, for example of order 1 m or even less, is going to be particularly attractive.

Other features and advantages of the invention will be apparent to the reader of the following description of a preferred embodiment of the invention, given as an example and with reference to the attached drawings.

DETAILED DESCRIPTION OF THE DISCLOSURE

Figure 1:
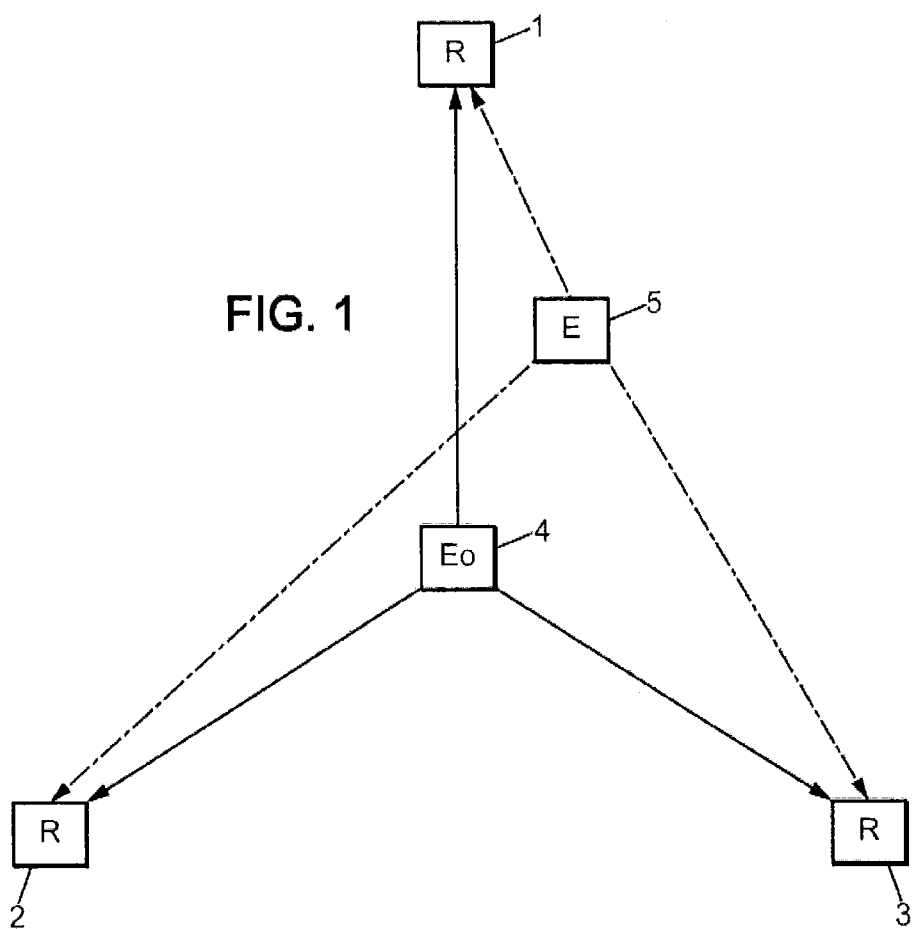
FIG. 1 schematically shows a sample locating system according to an embodiment of the invention.

FIG. 1 schematically shows a sample locating system according to an embodiment of the invention.

Three receivers 1, 2 and 3 are arranged in space, for example, respectively near vertexes of an equilateral triangle. A transmitter 4 of known position is disposed in this space, for example at the center of this equilateral triangle. Also located in this space is a transmitter 5 of unknown position whose position is to be determined.

The transmitter 4 of known position sends signals, represented by the arrows, to the receivers 1 to 3. The transmitter 5 of unknown position sends signals, represented by the arrows, to the receivers 1 to 3.

All the positions of receivers 1 to 3 are known as is the position of the transmitter 4 of known position. Consequently, based on these known positions it is easy to calculate the time of flight differences for the signals: difference between the time-of-flight of the signal from the transmitter 4 to the receiver 1, and the time-of-flight of the signal from the transmitter 4 to the receiver 2; difference between the time-of-flight of the signal from the transmitter 4 to the receiver 1, and the time-of-flight of the signal from transmitter 4 to receiver 3; and difference between the time-of-flight of the signal from transmitter 4 to receiver 2, and the time-of-flight of the signal from transmitter 4 receiver 3. Here, in the case of FIG. 1 these time-of-flight differences are all zero.

First, an initial filtering, centered on the transmission frequency of the transmitter 4 is done on the broad band signals received by the receivers 1 to 3.

Next, the pairwise execution of the cross-correlation of the signals received by the receivers—meaning the cross-correlation between the signal transmitted by transmitter 4 and received by receiver 1, and the signal transmitted by transmitter 4 and received by receiver 2; the cross-correlation between the signal transmitted by transmitter 4 and received by receiver 1, and the signal transmitted by transmitter 4 and received by receiver 3; and the cross-correlation between the signal sent by transmitter 4 and received by receiver 2 and the signal sent by transmitter 4 and received by receiver 3—will most often give maxima at nonzero temporal offsets because of different common time reference values known at the various receivers 1 to 3 because of the intrinsic imprecision of the value of this common time reference communicated to each of the receivers 1 to 3, of order 100 ns at five sigma, meaning less than or equal to 100 ns in the large majority of cases.

By taking one of the receivers as reference receiver, for example the receiver 1, two temporal offsets are obtained: a first temporal offset T12 corresponding to the difference between the time-of-flight of the signal from the transmitter 4 to the receiver 1, and the time-of-flight of the signal from transmitter 4 to receiver 2; and a second temporal offset T13 corresponding to the difference between the time-of-flight of the signal from the transmitter 4 to the receiver 1 and the time-of-flight of the signal from the transmitter 4 to the receiver 3.

The common time reference value known at receiver 1 is retained. The common time reference value known by receiver 2 is corrected by a value T12 in order to be able to be temporally reset to the common time reference value known by receiver 1. The common time reference value known by receiver 3 is corrected by a value T13 in order to be able to be temporally reset to the common time reference value known by receiver 1. At the outcome of this temporal resetting, all the receivers 1 to 3 have exactly the same common time reference value.

Alternatively, the receivers can be reset pairwise, for each pair of receivers, for example resetting receivers 1 and 2 together, then resetting receivers 1 and 3 together, and finally resetting receivers 2 and 3 together.

Then, a second filtering, centered on the transmission frequency of the transmitter 5 is done on the broad band signals received by the receivers 1 to 3.

The time of flight differences for the signals—difference between the time-of-flight of the signal from the transmitter 5 to the receiver 1, and the time-of-flight of the signal from the transmitter 5 to the receiver 2; difference between the time-of-flight of the signal from the transmitter 5 to the receiver 1, and the time-of-flight of the signal from transmitter 5 to receiver 3; and difference between the time-of-flight of the signal from transmitter 5 to receiver 2, and the time-of-flight of the signal from the transmitter 4 to the receiver 3—are measured based on the signals received by receivers 1 to 3, previously filtered at the measured time-of-flight differences.

These measurements are done on the basis of the pairwise execution of the cross-correlation of the signals received by the receivers and filtered around the transmission frequency of the transmitter 5 of unknown position. In that way, the cross-correlations are done: between the signal transmitted by the transmitter 4 and received by the receiver 1, and the signal transmitted by the transmitter 4 and received by the receiver 2; between the signal transmitted by the transmitter 4 and received by the receiver 1, and the signal transmitted by transmitter 4 and received by receiver 3; and between the signal transmitted by transmitter 4 and received by receiver 2, and the signal transmitted by transmitter 4 and received by receiver 3.

These cross-correlations, done with a sliding windows, will have maximums for some temporal offset values which correspond to time-of-flight differences described above in which a representative of the distances between the transmitter 5 of unknown position on the one hand and the receivers 1 to 3 on the other hand. With a simple and conventional geometric construction, the temporal separations can be related to these distances. The knowledge of these distances gives the position of the transmitter 5 of unknown position relative to the various receivers 1 to 3 and therefore the position of the transmitter 5 in the space considered. The position obtained for the transmitter 5 is very precise because it no longer has the intrinsic imprecision of the value of the common time reference which was precisely reset between the various receivers 1 to 3.

Figure 2:
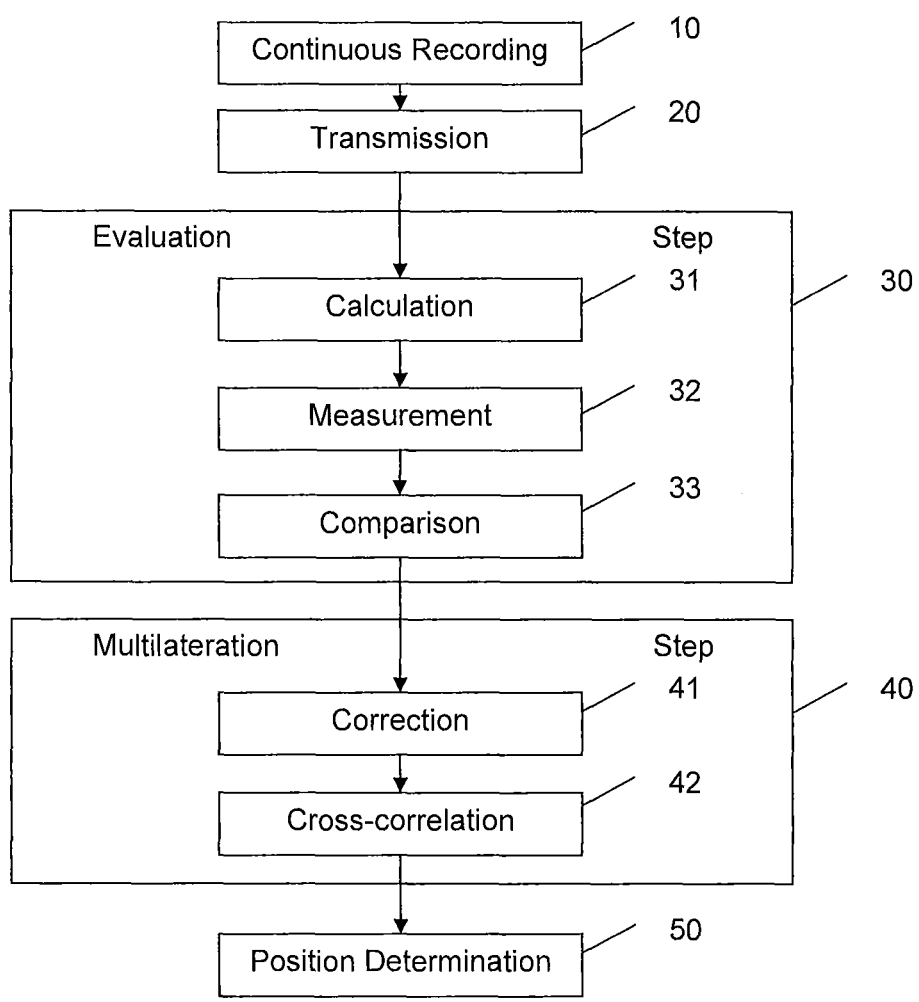
FIG. 2 schematically shows a sample locating method according to an embodiment of the invention.

FIG. 2 schematically shows a sample locating method according to an embodiment of the invention.

In a continuous recording phase 10, a continuous recording of the signals transmitted both by the transmitter 4 of known position and by the transmitter 5 of unknown position is made by the receivers 1 to 3 which in fact receive broadband signals over several hours, for example over five hours in circular recording.

At any moment, for example when the continuous recording of receivers 1 to 3 is stopped because of a specific event, the last five hours of signals recorded by the receivers 1 to 3 are available. These signals recorded over the most recent hours are then sent to a processing unit or an analysis station during a transmission phase 20.

First, a step of evaluation 30, and then a step of multilateration 40 are going to be done based on these broadband signals received by the receivers 1 to 3. In the evaluation step 30, a calculation phase 31, a measurement phase 32 and a comparison phase 33 are going to be done successively. In the multilateration step 40, a correction phase 41 and across-correlation phase 42 are going to be done successively.

In the calculation phase 31, a calculation of the time-of-flight differences between receivers of the signals transmitted by the transmitter 4 of known position at a different frequency from that of the transmitter 5 of unknown position and respectively received by the receivers 1 to 3 is done based on the known positions of receivers 1 to 3 and the transmitter 4 of known position as explained in more detail with FIG. 1.

In the measurement phase 32, a measurement of said time-of-flight differences is done by cross-correlation between the signals received by the receivers as explained in more detail with FIG. 1.

In the comparison phase 33, a comparison between said calculated time-of-flight differences and said measured time-of-flight differences giv[es], for each receiver, the desired temporal offset, as explained in more detail with FIG. 1.

In the correction phase 41, the temporal offsets are corrected so as to reset the receivers 1 to 3 to the same common time reference value, as explained in more detail with FIG. 1.

A cross-correlation phase 42, as described in more detail with FIG. 1, gives temporal offset values which correspond to time-of-flight differences which are representative of the distances from the transmitter 5 of unknown position to each of the receivers 1 to 3.

In a position determination phase 50, the temporal separations can be related to these distances with a simple and conventional geometric construction. The knowledge of these distances gives the position of the transmitter 5 of unknown position relative to the various receivers 1 to 3 and therefore the position of the transmitter 5 in the space considered. The position obtained for the transmitter 5 is very precise because it no longer has the intrinsic imprecision of the value of the common time reference which was precisely reset between the various receivers 1 to 3.

Of course, the present invention is not limited to the examples and embodiments described and shown, but it is subject to many variants accessible to the person skilled in the art.

The invention claimed is:

1. A method for locating a signal transmitter whose position is unknown, by the use of signal receivers which are synchronized with each other to a common time reference and whose positions are known, comprising:

a step of multilateration by time difference of arrival, which is done with the signals sent by the transmitter with unknown position and respectively received by the receivers, characterized in that:

said step of multilateration by time difference of arrival is preceded by a step of evaluation of temporal offsets between the values from the common time reference respectively known by the receivers, said step of multilateration by time difference of arrival is done by correcting said temporal offsets so as to reset the receivers to a single time reference value common to the receivers or each pair of receivers; and wherein the step of evaluation does:

a calculation of the time-of-flight differences, between receivers, of the signals transmitted by another transmitter of known position at a different frequency from that of the transmitter of unknown position and respectively received by the receivers, based on known positions of the receivers and of that other transmitter of known position, a measurement of said time-of-flight differences, by cross-correlation between the signals received by the receivers, a comparison between said calculated time-of-flight differences and said measured time-of-flight, giving, for each receiver, said temporal offset.

2. The method for locating according to claim 1, characterized in that the signals sent by the transmitter of unknown position and respectively received by the receivers are recorded by the receivers simultaneously with the signals sent by this other transmitter of known position and respectively received by the receivers, where said receivers have a sufficiently broad receiving band for simultaneously receiving signals at different frequencies corresponding respectively to the transmission frequency of said transmitter of unknown position and the transmission frequency of said other transmitter of known position.

3. The method for locating according to claim 2, characterized in that this other transmitter of known position is located in the middle of the receivers, preferably near the barycenter of the receivers.

4. The method for locating according to claim 1, characterized in that said step of multilateration does a cross-correlation between the signals received by the receivers at the transmission frequency of said transmitter of unknown position, where said signals were previously temporally reset to said same common time reference value.

5. The method for locating according to claim 1, characterized in that receivers continuously and without interruption record the period extending between, first, receiving signals sent by the transmitter of known position that are used for performing said step of evaluation of said temporal offsets and, second, receiving the signals sent by the transmitter of unknown position that are used for performing said multilateration step.

6. The method for locating according to claim 1, characterized in that the signals sent by the transmitter of unknown position and respectively received by the receivers are continuously recorded by the receivers, preferably over a period of at least one or more hours.

7. The method for locating according to claim 1, characterized in that the number of receivers is at least three, preferably at least four.

8. The method for locating according to claim 1, characterized in that said common time reference is the absolute time given by a geolocalization system, preferably UTC time given by GPS.

9. The method for locating according to claim 1, characterized in that said signals are emitted in a radio frequency range, preferably the HF frequency range or in the VHF frequency range.

10. A process for locating, in a prison, prisoners each provided with a signal transmitter of unknown position operating at a different frequency from that of other prisoners, using the locating method according to claim 1.

11. A process for locating, in a nuclear power plant, staff each provided with a signal transmitter of unknown position operating at a different frequency from that of other staff, using the locating method according to claim 1.

12. A process for locating, in a disaster zone, like for example after an avalanche or an earthquake, people each provided with a signal transmitter of unknown position operating at a different frequency from that of other people, using the locating method according to claim 1.

13. A system for locating a signal transmitter whose position is unknown, by the use of signal receivers which are synchronized with each other to a common time reference and whose positions are known, comprising:
    signal receivers which are synchronized with each other to a common time reference and whose positions are known;
    another transmitter of known position at a different frequency from that of the transmitter of unknown position;
    a processing unit suited for performing a step of multilateration by time difference of arrival, which is done with the signals sent by the transmitter with unknown position and respectively received by the receivers, characterized in that said processing unit is also suited such that:
        said step of multilateration by time difference of arrival is preceded by a step of evaluation of temporal offsets between the values from the common time reference respectively known by the receivers,
        said step of multilateration by time difference of arrival is done by correcting said temporal offsets so as to reset the receivers to a single time reference value common to the receivers or each pair of receivers; and
    wherein said step of evaluation does:
        a calculation of the time-of-flight differences, between receivers, of the signals transmitted by another transmitter of known position at a different frequency from that of the transmitter of unknown position and respectively received by the receivers, based on known positions of the receivers and of that other transmitter of known position,
        an indirect measurement of said time-of-flight differences, by cross-correlation between the signals received by the receivers,
        a comparison between said calculated time-of-flight differences and said measured time-of-flight, giving, for each receiver, said temporal offset.

* * * * *

UNITED STATES PATENT AND TRADEMARK OFFICE
CERTIFICATE OF CORRECTION

PATENT NO. : 10,345,429 B2
APPLICATION NO. : 15/537813
DATED : July 9, 2019
INVENTOR(S) : Remi Rollero It is certified that error appears in the above-identified patent and that said Letters Patent is hereby corrected as shown below:

On the Title Page

Item (71), delete the words "AMESYS" and substitute therefore --AVANTIX--.

Item (73), delete the words "AMESYS" and substitute therefore --AVANTIX--.

Signed and Sealed this
Third Day of December, 2019

Andrei Iancu
*Director of the United States Patent and Trademark Office*